US008649576B2

(12) United States Patent
Scorcioni et al.

(10) Patent No.: US 8,649,576 B2
(45) Date of Patent: Feb. 11, 2014

(54) ARBORIZATION RECONSTRUCTION

(75) Inventors: Ruggero Scorcioni, Arlington, VA (US); Giorgio Ascoli, Fairfax Station, VA (US); Bonnie Lasher, Lorena, TX (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 1700 days.

(21) Appl. No.: 11/763,758

(22) Filed: Jun. 15, 2007

(65) Prior Publication Data

US 2008/0013815 A1   Jan. 17, 2008

Related U.S. Application Data

(60) Provisional application No. 60/805,018, filed on Jun. 16, 2006.

(51) Int. Cl.
*G06K 9/00* (2006.01)

(52) U.S. Cl.
USPC ........... 382/128; 382/131; 382/132; 382/282; 382/284; 382/285; 382/293; 382/294; 382/295; 382/296; 378/4; 378/20; 128/922

(58) Field of Classification Search
USPC ......... 382/128, 131, 132, 154, 197, 282, 284, 382/285, 293–296; 128/922; 378/4–27; 345/629, 630
See application file for complete search history.

(56) References Cited

U.S. PATENT DOCUMENTS

| | | | | |
|---|---|---|---|---|
| 4,908,573 A | * | 3/1990 | Kaufman et al. | 324/309 |
| 5,231,580 A | * | 7/1993 | Cheung et al. | 382/128 |
| 5,796,861 A | * | 8/1998 | Vogt et al. | 382/128 |
| 6,272,235 B1 | * | 8/2001 | Bacus et al. | 382/133 |
| 6,764,217 B2 | * | 7/2004 | Yasuda et al. | 378/205 |
| 7,113,623 B2 | * | 9/2006 | Chen et al. | 382/128 |
| 7,397,942 B2 | * | 7/2008 | Bruijns | 382/154 |
| 7,426,256 B2 | * | 9/2008 | Rasche et al. | 378/8 |
| 7,492,934 B2 | * | 2/2009 | Mundy et al. | 382/128 |
| 7,639,855 B2 | * | 12/2009 | Matsumoto | 382/131 |
| 7,978,887 B2 | * | 7/2011 | Mundy et al. | 382/128 |

(Continued)

OTHER PUBLICATIONS

Carlbom I et al., "Computer-assisted registration, segmentation, and 3D reconstruction from images of neuronal tissue sections" IEEE Trans Med Imaging. Jun. 1994; vol. 13(2):pp. 351-362.*

(Continued)

*Primary Examiner* — Matthew Bella
*Assistant Examiner* — Julian Brooks
(74) *Attorney, Agent, or Firm* — DLA Piper LLP US

(57) ABSTRACT

A method and system comprising: generating at least one slice image by carpeting a multitude of digital images based upon a two-dimensional (2-D) reference system, each of the multitude of digital images associated with a location in the 2-D reference system and each showing a representation of an arborization and/or landmark such that digital images not showing a representation of an arborization and/or landmark are excluded; carpeting the multitude of digital images together to create a slice image; aligning the slice image with other similarly created slice images using landmark information to determine the amount of 2-D rotation and/or translation to be applied to each slice image; vectorizing the representation of the arborization on each slice image, the vectorization creating a series of segments; assigning a type to at least one of the series of segments based on a unique characteristic of arborization; and grouping related segments together.

17 Claims, 21 Drawing Sheets

Carpeting

(56) References Cited

U.S. PATENT DOCUMENTS

| | | | |
|---|---|---|---|
| 8,090,167 B1 * | 1/2012 | Scorcioni et al. | 382/128 |
| 8,098,919 B2 * | 1/2012 | Rasche et al. | 382/132 |
| 2004/0170312 A1 * | 9/2004 | Soenksen | 382/133 |
| 2006/0133657 A1 * | 6/2006 | Schmid et al. | 382/128 |
| 2006/0210147 A1 * | 9/2006 | Sakaguchi | 382/154 |
| 2008/0027651 A1 * | 1/2008 | Siekmeier et al. | 702/19 |

OTHER PUBLICATIONS

Glaser et al., "Neuron imaging with Neurolucida—A PC-based system for image combining microscopy", Computer Medical Imaging and Graphics, vol. 14, No. 5, pp. 307-317 (1990).

Gras et al. "NEUREC—a program package for 3D-reconstruction from serial sections using microcomputer", Computer Programs in Biomedicine, vol. 17, pp. 145-155 (1983).

Li et al. "The hippocampal CA3 network: an in vivo intracellular labeling study", J. Comp. Neur., vol. 339, pp. 181-208 (1994).

Scorcioni et al., "Algorithmic reconstruction of complete axonal arborizations in rat hippocampal neurons", Neurocomputing, vol. 65-66, pp. 15-22 (2005).

Tamamaki et al., "Three-dimensional analysis of the whole axonal arbors orginating from single CA2 pyramidal neurons in the rat hippocampus with the aid of a computer graphic technique", Brain Research, vol. 452, pp. 255.272 (1988).

Wolf et al., "A fast 3-dimensional neuronal tree reconstruction system that uses cubic polynomials to estimate dendritic curvature" Journal of Neuroscience Mehtods, vol. 63, pp. 137-145 (1995).

* cited by examiner

Color Codes

| Color | Type |
|---|---|
| Red | Large Axon/Dendrite |
| Purple | Medium Axon |
| Green | Small Axon/Dendrite |
| Black | Circle |
| Yellow | Soma |
| Pink | Landmarks |

FIG. 4

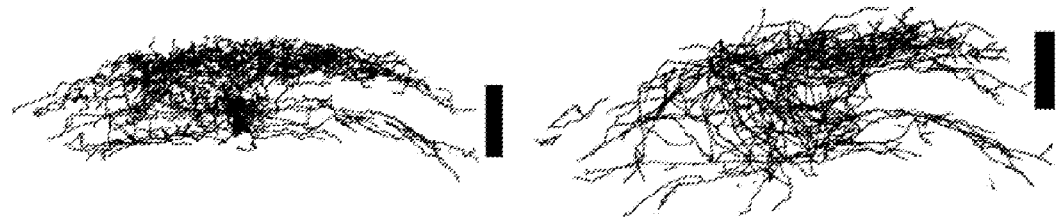
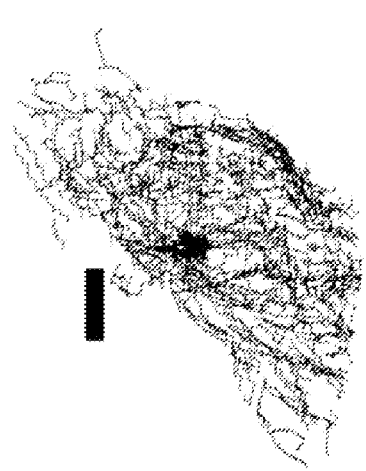
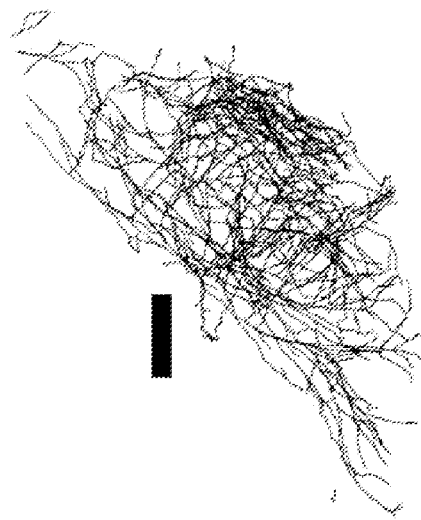
FIG. 14A
FIG. 14B
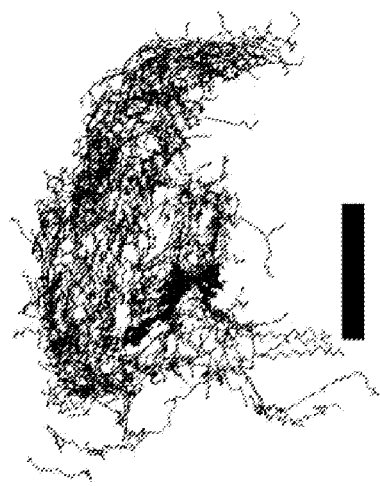
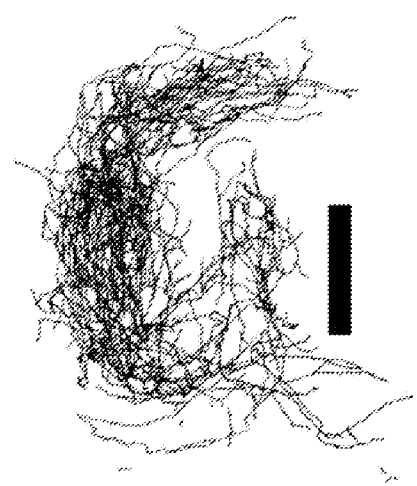

ARBORIZATION RECONSTRUCTION

CROSS-REFERENCE TO RELATED APPLICATIONS

This application claims the benefit of U.S. Provisional Application No. 60/805,018, filed Jun. 16, 2006, entitled "Arborization Reconstruction," which is hereby incorporated by reference in its entirety.

STATEMENT REGARDING FEDERALLY SPONSORED RESEARCH OR DEVELOPMENT

This invention was made with government support under grant number NS39600 awarded by the National Institute of Health. The government has certain rights in the invention.

BACKGROUND OF THE INVENTION

Neuroanatomy studies and analyzes the structure of brain regions and cells. Core of classical neuroanatomical studies have always been hand based drawing of neuronal structures of microscopy specimen. These 2-dimensional (2D) drawings are easy to display but present increasing difficulty for any other kind of research since they remove the Z component from the original data.

Neuronal reconstruction is a small sector within Neuroanatomy. One of the reasons of its small size and influence is due to the extreme amount of man-power required to extract data. Typical reconstruction studies are measured in man-years and their results are limited. These huge time requirements with the limited results have constrained the amount of studies performed. At the same time neuronal structures are the basic building block of all brains and multiple fields are already utilizing all available reconstructions. There is a need to reconstruct more neurons from more brains of different species. From these considerations a more time-efficient technique is an overdue need within the neuroanatomical community. If reconstruction outputs will be limited for longer periods than important sectors like electrophysiological simulations, network analysis, and neuroanatomical studies could be affected.

With the advent of modem computers a new push towards 3D neuronal reconstructions has been in place from different sources (Tamamaki et al., 1988; Glaser and Glaser, 1990). Few neuronal techniques are available that produce 3D data like MicroBright Field Neurolucida (available from MBF Bioscience of Williston, Vt.) or template base data (Gras and Killman 1983). Of these techniques only Neurolucida, the most common choice for 3D neuronal reconstructions, generates connected arborizations that allow full 3D analysis. Other less widely used reconstruction techniques are available. One is a template-based system that produces disconnected set of segments (Tamamaki et al., 1988). Another technique uses polynomial interpolation to join 2D reconstruction from serial images (Wolf et al., 1995). Neurolucida represents the current standard in the field and it is installed in many laboratories across the globe. Disadvantages of this technique are its cost, its specialized hardware requirements and the amount of human intervention required to obtain good data. In particular a full system requires an investment of ~$80 k in specialized hardware and software.

What is needed is an inexpensive and temporally efficient system to digitally reconstruct neuronal arborizations for use in evaluating the structure of brain cells.

BRIEF DESCRIPTION OF THE DRAWINGS

FIG. 4 shows examples of color codes that may be used by an aspect of an embodiment of the present invention.

FIG. 14A shows different views of an example CA3c neuron reconstructed using an aspect of an embodiment of the present invention.

FIG. 14B shows different view of the same CA3c neuron reconstructed using a different technique for technique comparison.

DETAILED DESCRIPTION OF EMBODIMENTS

The presently described embodiments disclose an inexpensive and temporally efficient system to digitally reconstruct arborizations. The arborizations may include neuronal arborizations.

Full 3D digital reconstructions of neuronal arborizations may be used to evaluate the structure of brain cells. Present techniques to digitally reconstruct neuronal arborizations are both expensive and highly time consuming. Presently disclosed embodiments may be used to digitize neuronal structure. These techniques may be used to automatically digitalize letter size hand-drawn lucida drawings. These disclosed embodiments should reduce the man-year requirements to ⅙ (−80%) of the time required on a Neurolucida system.

Figure 1:
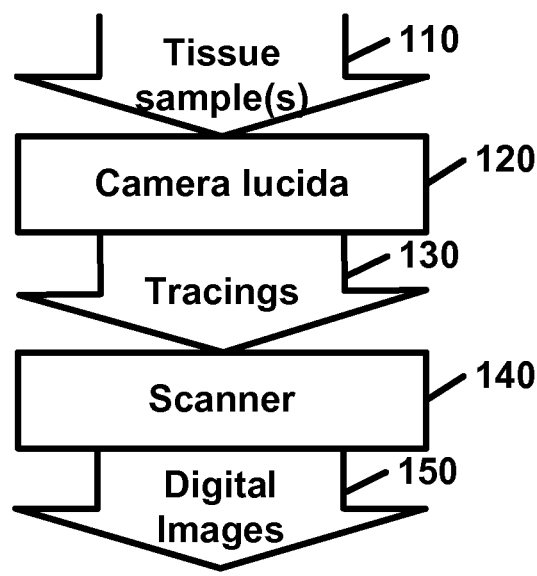
FIG. 1 is a flowchart showing tracing and digitization of sample(s) as per an aspect of an embodiment of the present invention.

FIG. 1 shows a set of initial steps that may be taken in order to generate a set of digital images 150. First a set of slides with tissue samples (such as those shown in FIG. 2) should be acquired or prepared. For the validation of this technique a set of slides were used that were provided by Buszaki lab (Li et al.). Examples of other preparations that are compatible with the technique include Golgi staining or HRP injections. All slices may be evaluated under microscope with a lens and a camera lucida apparatus 120. In many cases a 40× may be sufficient. The camera lucida apparatus 120 should allow the manual drawing of specimen on a paper that is appropriately sized for a scanner 140 such as US letter size paper. The drawings 130 may be created using pens such as Micron pens made by Sakura. Pen type and quality may be important for the successful completion of the technique. Once the drawings 130 are complete, a scanner 140 may be used to digitize tracings 130. The scanner 140 may be automated to increase temporal efficiency. A scanner 140 with a resolution of about 1200 dpi may be adequate for most scans. Digitized tracings 150 may then be processed on a computer such as a Windows-based PC (dual Xeon 3 Ghz, 2 GB ram, 120 GB disk) with a set of ad-hoc Java and Perl scripts.

Figure 2:
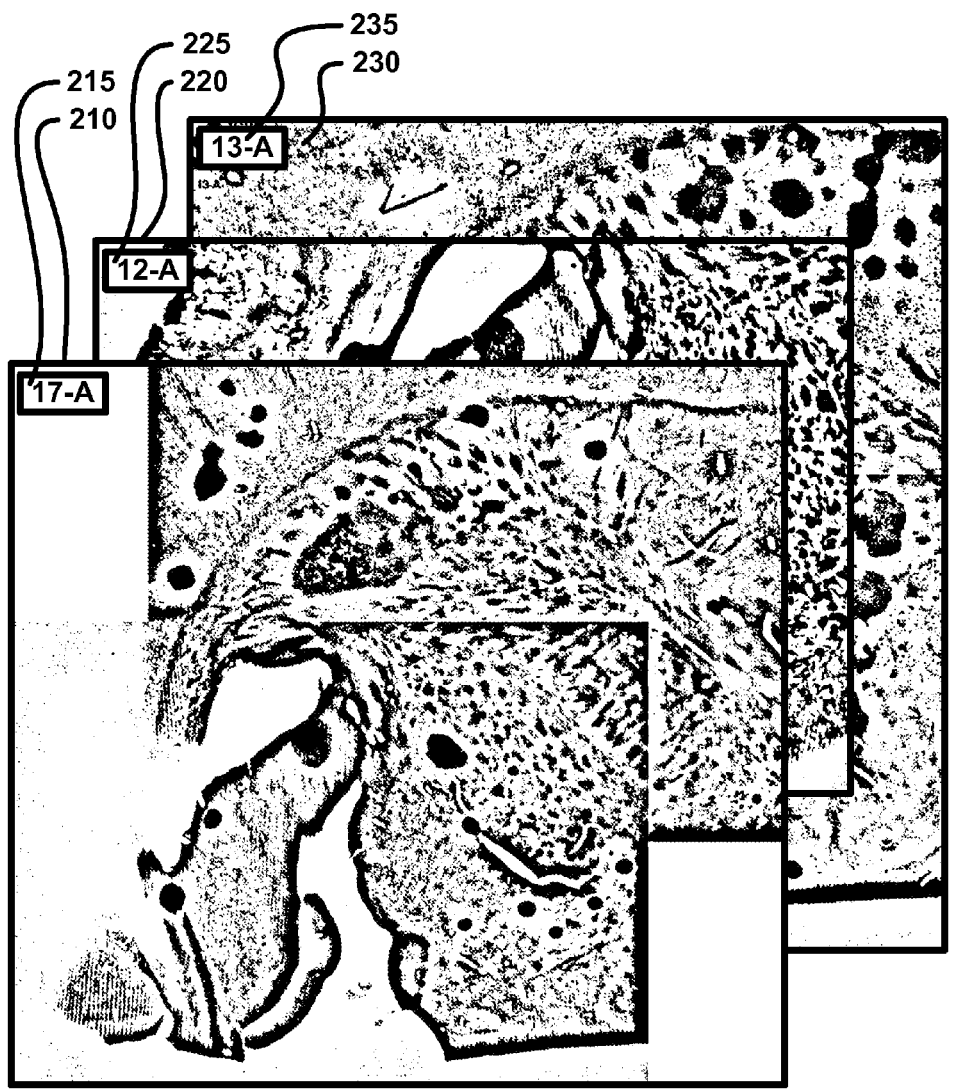
FIG. 2 shows an example stack of 2D digitalized images from a miscoscope for sequential alignment.

This technique may be divided in a series of steps that are presented below:

Sequential alignment: Provided tissue slices may be numbered based on their sequential order. For example, as shown in FIG. 2, tissue slices 210, 220 and 230 are numbered and labeled (See 215, 225 and 235). Blood vessels and other defining landmarks on each slice may be aligned with the adjacent slice to calculate the rotational angle difference, providing coordinates for later Z-alignment. For example, FIG. 2 shows the series three aligned tissue slices 110, 120 and 130 aligned using visual queues such as landmarks.

Tracing: Tracing may be performed on a microscope equipped with Camera Lucida 120 or equivalent device. Depending on the tracings 130, an objective magnification may need to be used. Typically, a magnification of approximately 40× should be suitable.

A convenient sized paper with a black cropping box printed on the paper may be used. The size of the paper may be determined by specifications of scanning equipment 140, microscope, lucida device 120, etc. When a lucida device 120 is used, the black box should be fully visible in the Camera Lucida 120 field of view. All structures of interest may be traced within this box.

Figure 3:
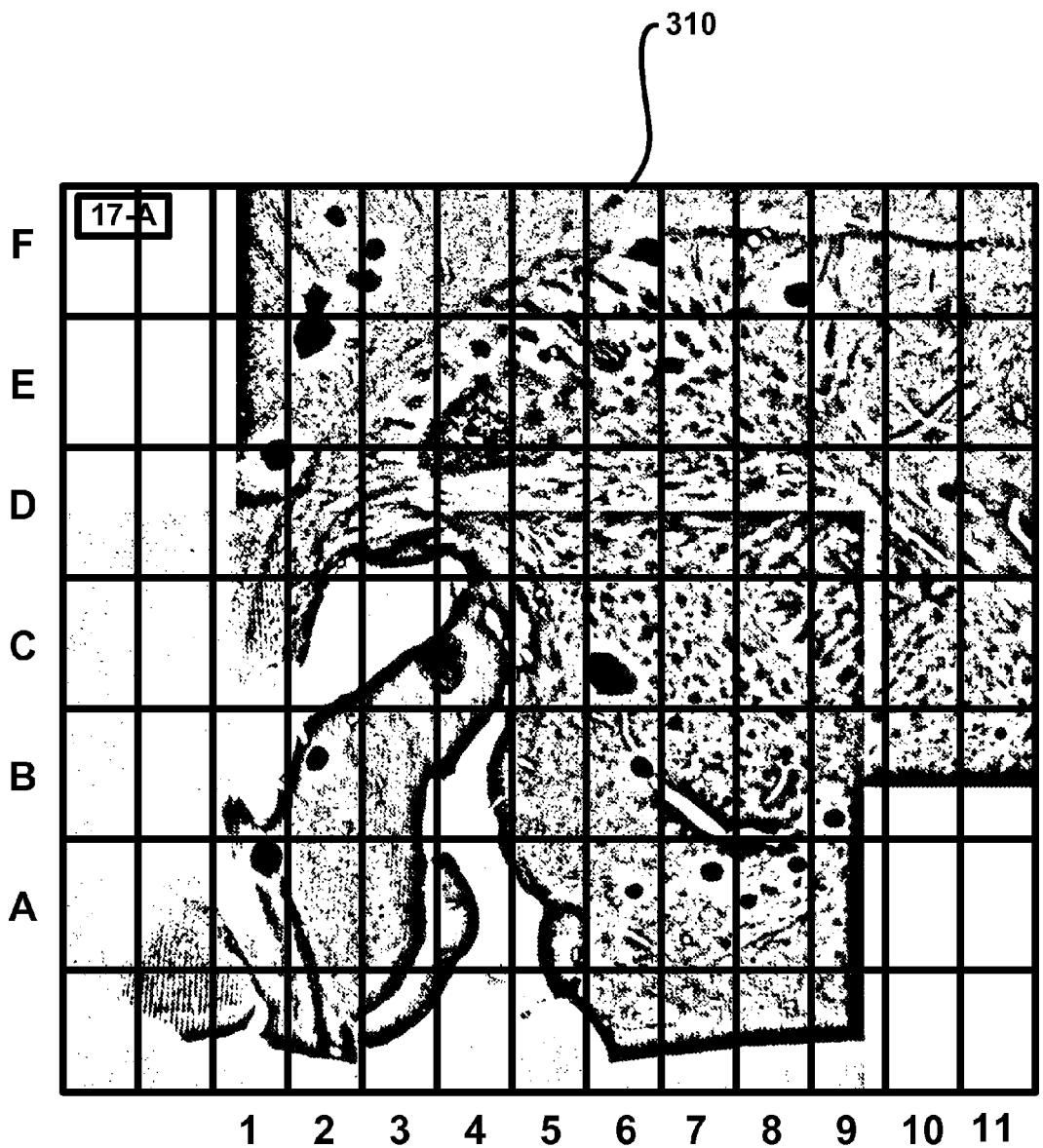
FIG. 3 shows an illustration of a slice image divided into a spatial grid as per an aspect of an embodiment of the present invention.

The grid is labeled While tracing, alphanumeric designations may used to label each page corresponding to its relative spatial position, i.e. Page 1 is designated A1 and the page to the right of A1 is designated A2, etc. FIG. 3 illustrates this technique. Slice 310 is shown divided into a spatial grid. Each cell in the grid is identified by the grid designators along the horizontal and vertical axes.

Each segment of interest may be traced with a unique method of identification to represent type(s) and diameter(s). One such way to provide a unique method of identification is to use an assigned color. Table 1, shown in FIG. 4, provides examples of color codes. Another method may be to use line patterns; however, any method that will result in the unique identification of a trace may be used.

Figure 5:
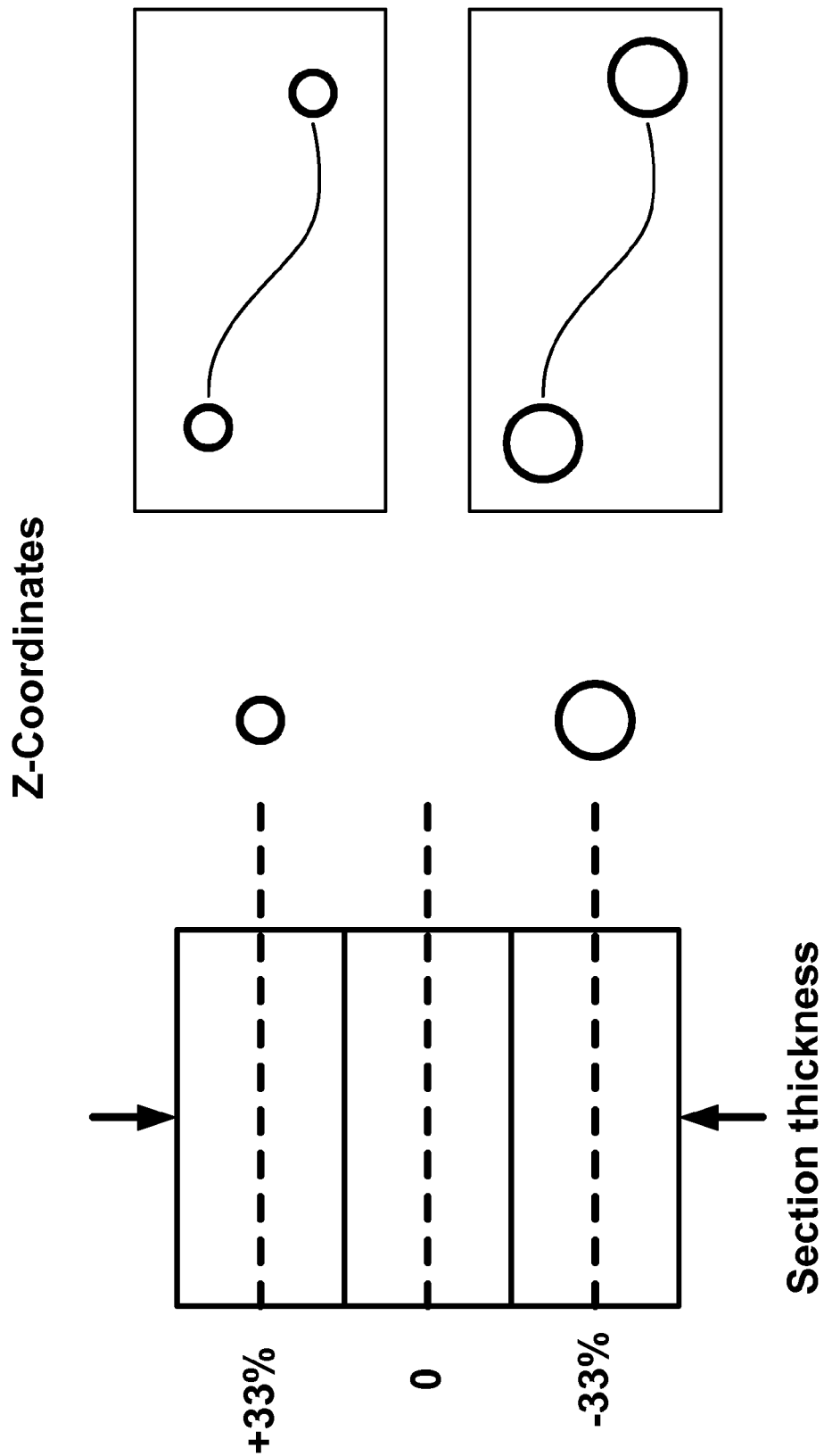
FIG. 5 shows representations of Z-coordinates as per an aspect of an embodiment of the present invention.

Each termination on the paper may be defined with a unique symbol. For example, as shown in FIG. 5, a black circle may be used. Another symbol, such as a differently sized circle may be used to represent whether or not the termination occurred at the top of the tissue (e.g. large diameter circle), or the bottom of the tissue (e.g. small diameter circle). This should facilitate Z-alignment of segments between tissue slices by taking a 2-D tracing and providing 3-D information. Since there are terminations in the center of the tissue as well, the tracing may be broken into segments such as thirds (33%).

Where axons and dendrites are both present, they may be drawn on separate sheets of paper but numbered identically, i.e. BC axon=BC dendrite. This should produce a separate reconstruction of dendrites that can be added to the axonal reconstruction.

Figure 6C:
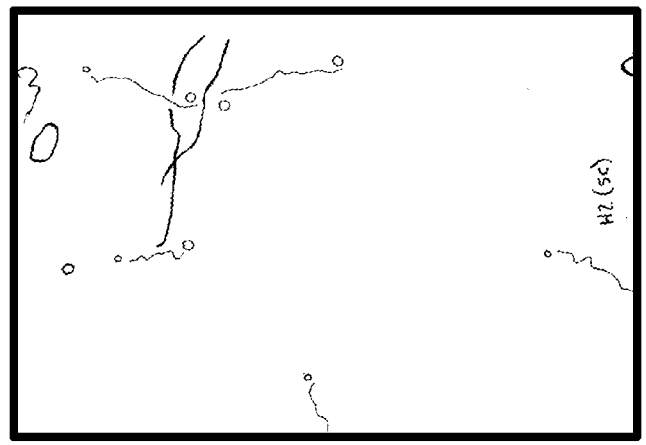
FIG. 6C shows cropped image of FIG. 6B as per an aspect of an embodiment of the present invention.
Figure 6B:
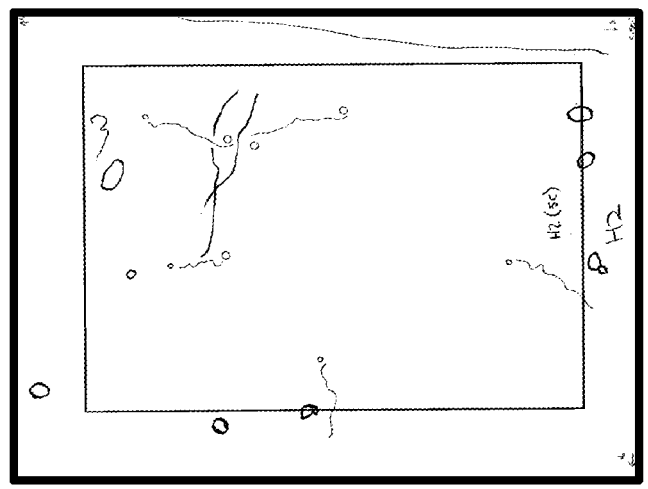
FIG. 6B shows the image of FIG. 6A after equalization as per an aspect of an embodiment of the present invention.
Figure 6A:
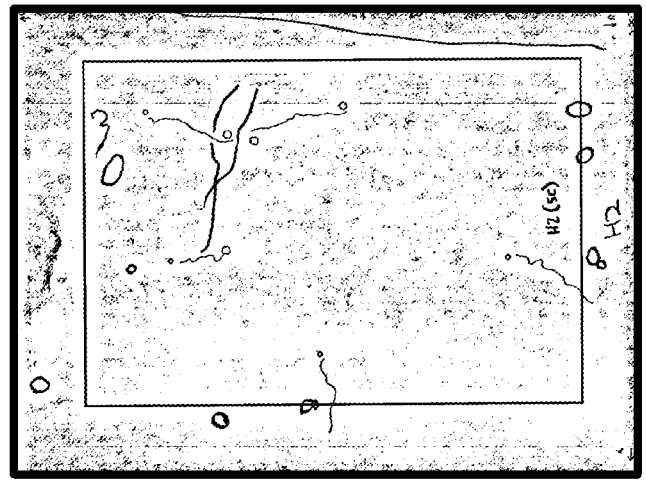
FIG. 6A shows an example tracing as per an aspect of an embodiment of the present invention.

Scanning: FIG. 6A is an example of a tracing of a spatial grid location on a tissue sample. Tracing paper may be digitized. One way to digitize the tracing paper is to use an automated scanner such as a MicroTeK ScanMaker 5950. Scanning resolution may be set to approximately 1200 dpi with a color depth of 24 bits. Other settings may be used. With this scanned, multiple sheets of paper may be fed to the machine at a time. To minimize deformation due to lamp warm-up, a batch of scans may be rescanned if the scanner was not sufficiently warmed-up.

The resulting digital image may be named (or renamed) to reflect the assigned label within that particular slice (e.g., if the paper label is N20, then its output scan will be stored as N20.jpg). For convenience, all paper belonging to a particular slice may be stored in a directory whose name reflect the slice number itself.

Equalization: Commercial scanner outputs can produce color intensity and accuracy that is dependent on a multitude of factors (room and scanner temperature, vibration, bulb light lifetime, use hours, etc). To limit and control for as many such factors as possible a digital equalization step may be introduced. During equalization, papers may be digitally processed to identify what is the average white background level (by averaging all pixels in the picture) and the darkest black present (by selecting the pixel with the lowest intensity). Once these two values are created all colors are equalized between these two extremes. The equalized version of FIG. 6A is shown in FIG. 6B. One skilled in the art will recognize that other equalization steps may be performed to correct for the results of other digitization methods.

Cropping: Scanned papers may be processed to remove all, but the area of interest within a cropping zone (designated in the FIG. 6A and FIG. 6B as the black box). The cropped version of FIG. 6B is shown in FIG. 6C.

Automated scanners can reduce the acquisition time by automating the paper movements within the scanner. Unfortunately automated paper movements may lead to distortions in the final scanned image. These distortions can be divided into at least two parts. One part is mechanical distortions leading to image deformations. A second part is color quality reproduction: no matter how dark is the black box, the scanned image may be represented by a range of gray shades. These two issues can render challenging cropping problem(s).

To solve both of these problems, software to identify the most likely box position and then compute a pixel by pixel (PbP) search may be utilized. Such software may be generated using a language such as Java. The PbP search may use an algorithm to identify all pixels belonging to the black box. To do so the PbP algorithm may consider all pixels, which are part already of the box and try to extend that boundary with a filling algorithm. This may lead to including all black adjacent pixels as part of the box. PbP should solve the majority of distortion problems. Due to its intrinsic nature PbP may introduce a new limitation on the minimum distance of a symbol (such as a black circle) from the box boundary. Experimentally, a distance of approximately 10 pixels has been shown to be safe. Cropped papers may be manually validated to ensure that no trace is cut and that no symbol is split.

Figure 7:
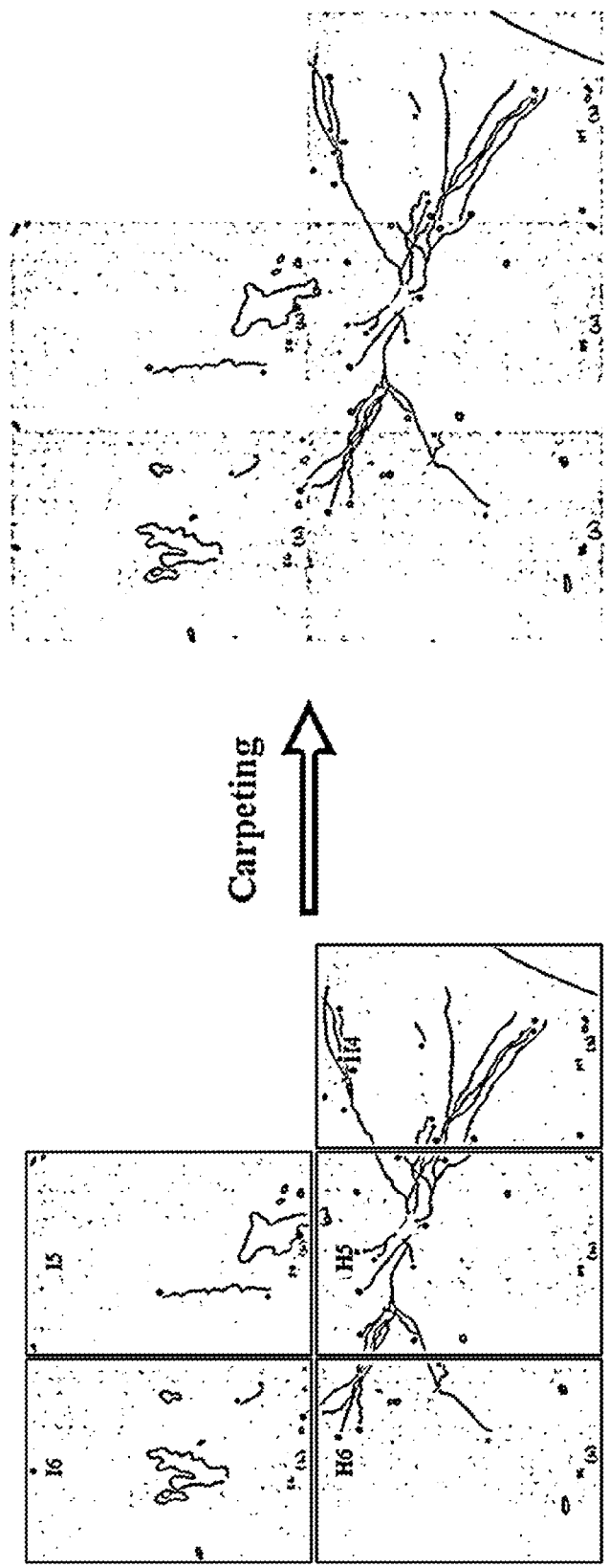
FIG. 7 shows carpeting of cropped images as per an aspect of an embodiment of the present invention.

Carpeting: Based on the number and label of all scanned images an electronic empty canvas may be created. Then, based on a relative coordinates system, cropped images may be cut and pasted to appropriate positions as shown in FIG. 7. Limits in the size of a maximum carpet may be present. The limit may be based upon software or hardware limitations. These limit(s) could affect the final resolution of each scan.

Figure 8:
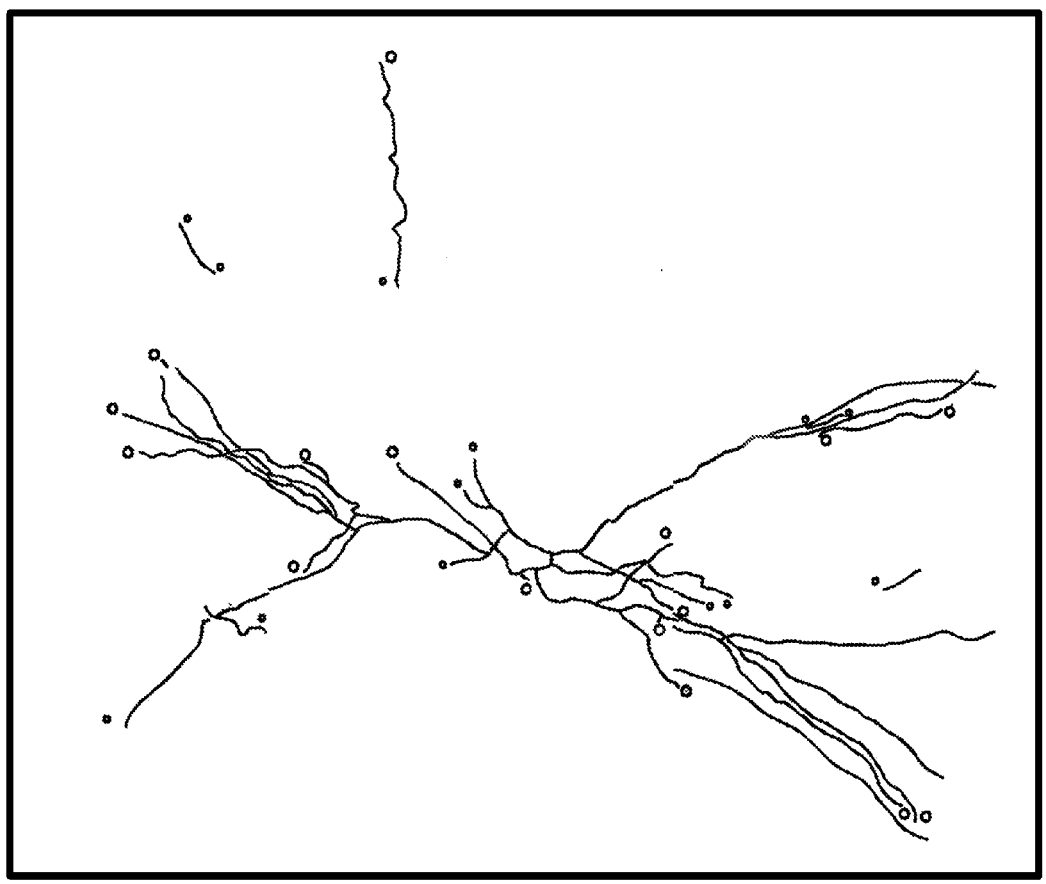
FIG. 8 shows FIG. 7 with landmarks removed as per an aspect of an embodiment of the present invention.

Landmark removal: To correctly identify each type of tracing, a correct identifier (such as color or line pattern) to type assignment may be used. To simplify this procedure, unnecessary identifiers may be removed. In this particular context, landmarks may need to be removed since they are essential for tracing and carpet alignment, but may be irrelevant for the final 3D reconstruction. FIG. 8 shows carpeted image of FIG. 7 with the landmarks removed. This step may be a recursive step that uses an identifier removal tool such as the Adobe Photoshop color removal tool. In the case of using the Adobe Photoshop color removal tool, a similarity threshold set to approximately 60% has been shown to be useful.

Figure 9:
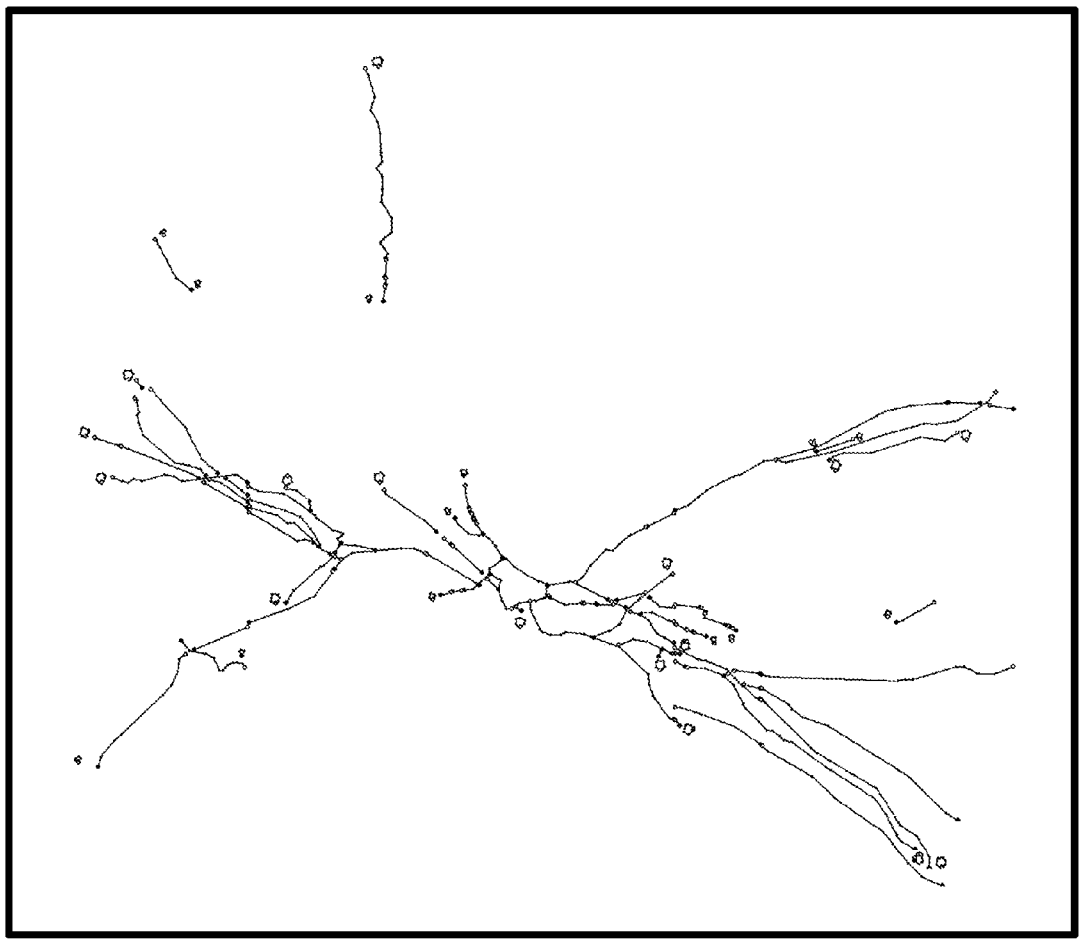
FIG. 9 shows a rasterized version of FIG. 8 as per an aspect of an embodiment of the present invention.

Vectorialization: FIG. 9 shows a rasterized version of FIG. 8. Rasterization may be performed using a commercial package such as Wintopo (available from softsoft.net of Bedfordshire in the UK). It is important to note that the freeware version of Wintopo can be used to produce the required files. Given a digital image, Wintopo extracts point coordinates and their interconnection. Wintopo is a conversion tool from raster images to vector data.

Each carpet may be loaded in an image rasterization program (such as Wintopo) and vector data extracted. Different options may be available to optimize the vector extraction. In particular the "Stentiford thinning" method in Wintopo has been shown to be useful. Similarly, setting the tolerance of the "Smooth Polyline Vectorisation" to approximately 30 (tenths of pixel widths) and setting the "Reduce Polylines during vectorisation" to approximately 30 has also been shown to be useful.

After each run, vectors may be analyzed to identify problem(s). In particular, correct identification of identifying symbols may be critical. Symbols assign the correct Z coordinates to terminal tips. This may be important for the correct tree reconstruction. As an example, correct circle vectorization is formed by a series of conjoint segment where the starting point coincides with the end point. All circles that do not satisfy the condition may be manually corrected with the black digital pencil. Image rasterization program output may be saved as ASCII X, Y, Z format.

Segmentation: Extracted vector data may need to be categorized by identifier. Here single point(s) are loaded, their identifier compared to an assigned legend (see Table in FIG. 4) and the corresponding type assigned to that specific point.

In the case where color is the identifier and paper is used, pen traits on normal paper may show great color variability. This variability may depend on paper, the pen itself, and in particular on its angle, speed and pressure. These properties may not be controllable beforehand, so identifier recognition software may be used or created. This algorithm may be composed of multiple steps. Carpets may be pre-processed to help the identifier recognition. In the case of color, the color assigned to point(s) may be the average of its color and all its neighborhood pixels that are not part of the background. Generally, each color data point may average 10 pixels. This point average may be compared to the average color components. The color component that is closer to the point average may be identified as the type assigned to the pixel.

Arborization: Arborization may utilize an algorithm to generate arborizations from template data. One such algorithm is disclosed in (Scorcioni and Ascoli, 2005). All vector data with an assigned type of interest may be loaded in memory. Each point may then be compared to other points that do not belong to the same line. At each step, the set of points that are closest to each other may be joined in the same line. This process may be repeated until only one line is left. The soma position may be identified by its type and one of its points may be selected as a starting point. Given this starting point, the whole structure may be recursively parsed and the corresponding digital output created. The output file may be saved in a format compatible with arborization storage such as the SWC format (Duke-Southampton SWC format). The SWC format expresses each point on a separate line by seven quantities: an integer code for the point; a code for its type (axon, apical dendrite etc); three spatial coordinates; the diameter; and the code of its parent (the next point toward the soma).

Figure 10:
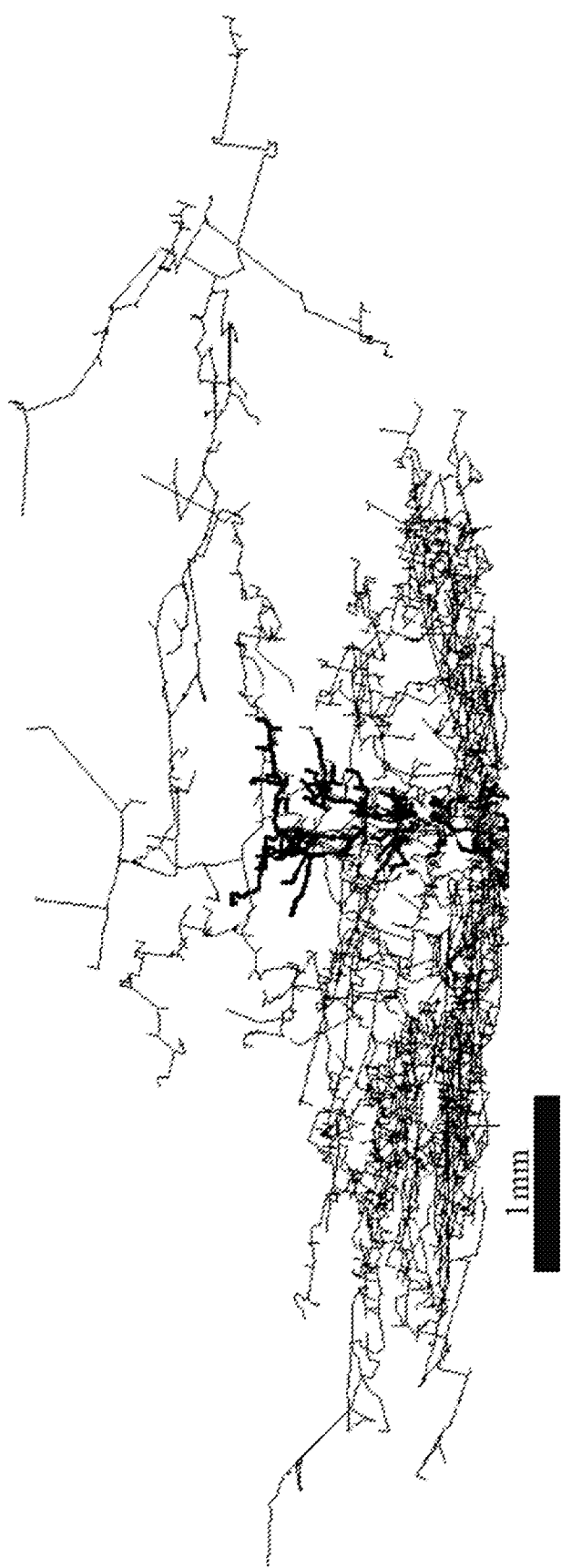
FIG. 10 shows an example CA3a pyramidal neuron reconstructed using an aspect of an embodiment of the present invention.
Figure 11:
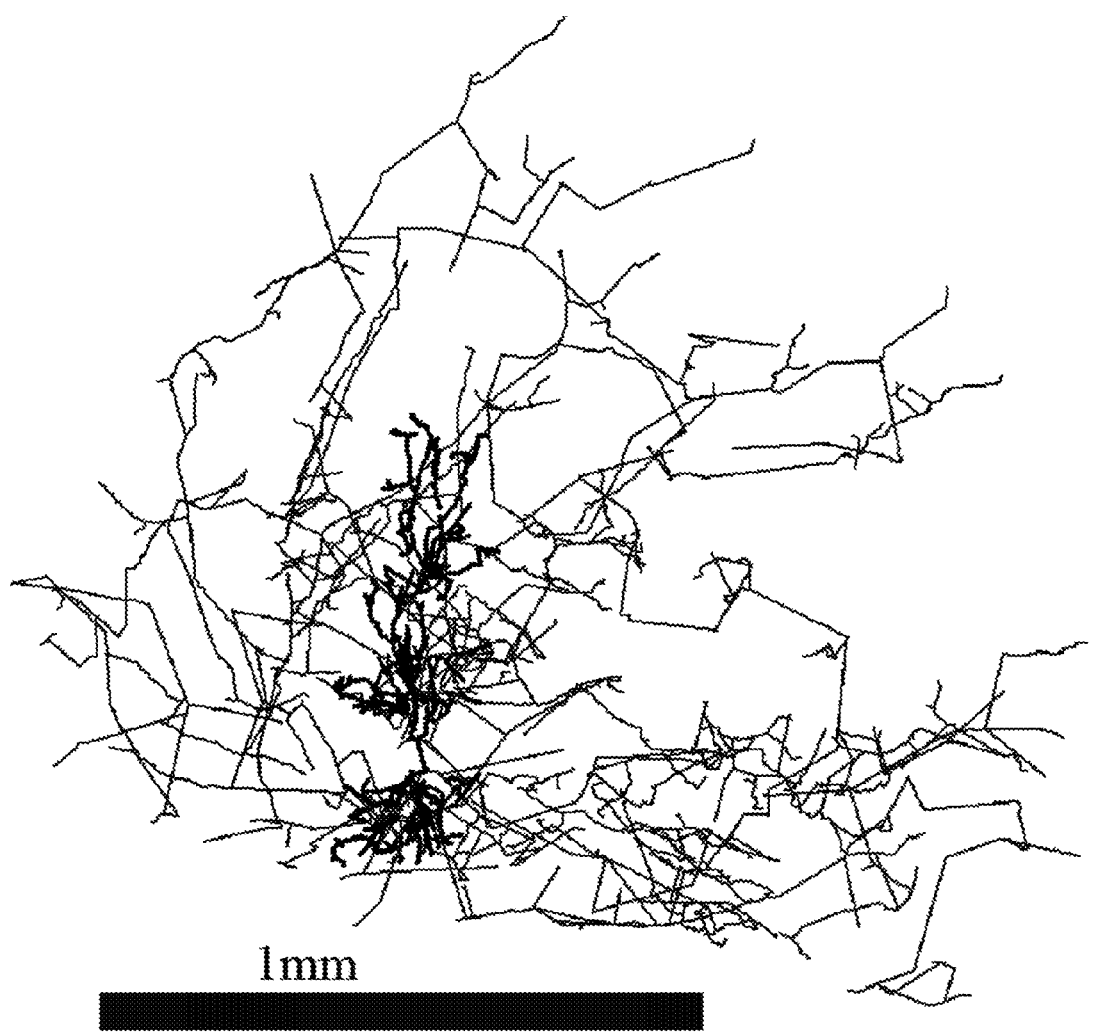
FIG. 11 shows an example CA3b pyramidal neuron reconstructed using an aspect of an embodiment of the present invention.
Figure 12:
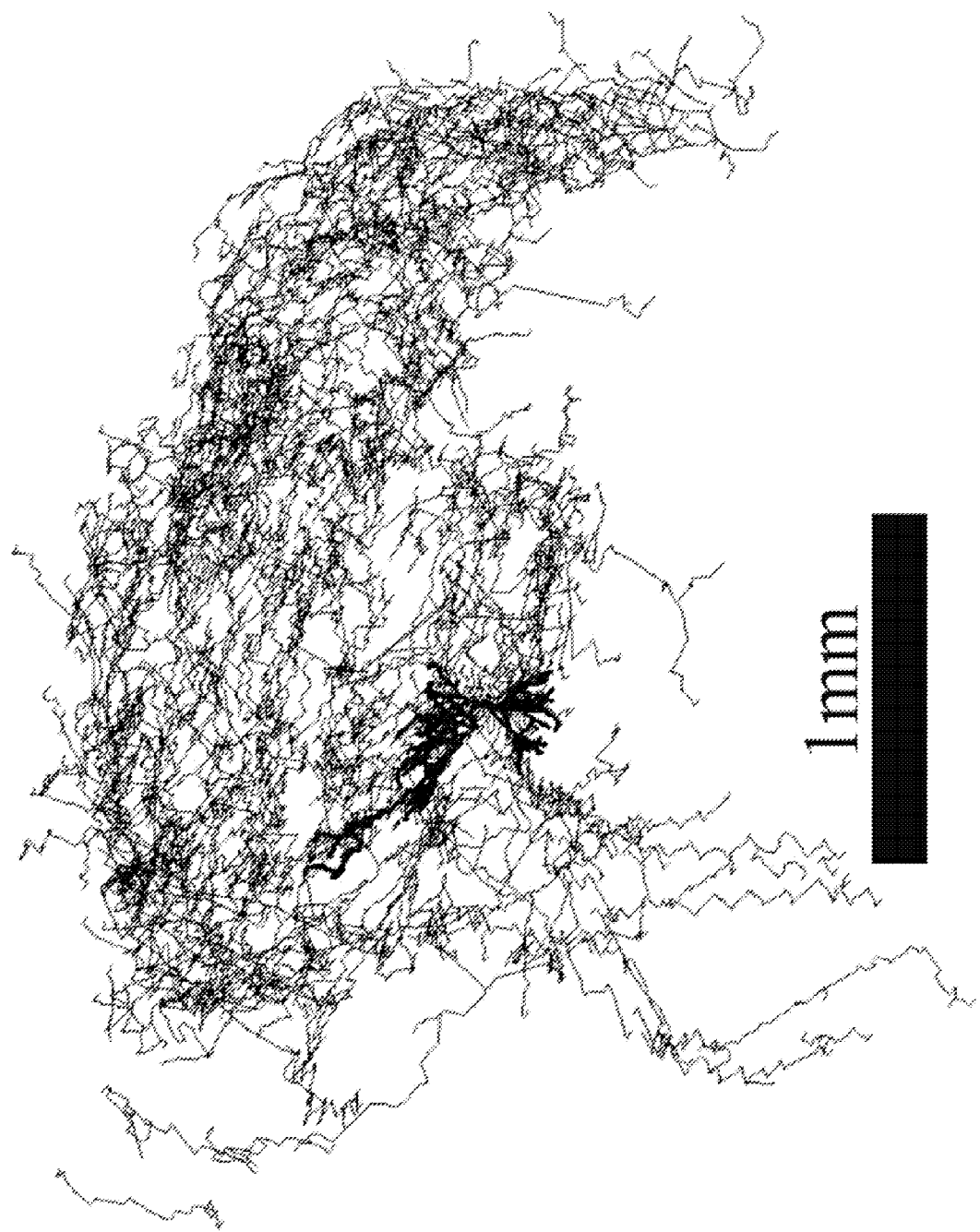
FIG. 12 shows an example CA3c pyramidal neuron reconstructed using an aspect of an embodiment of the present invention.
Figure 13:
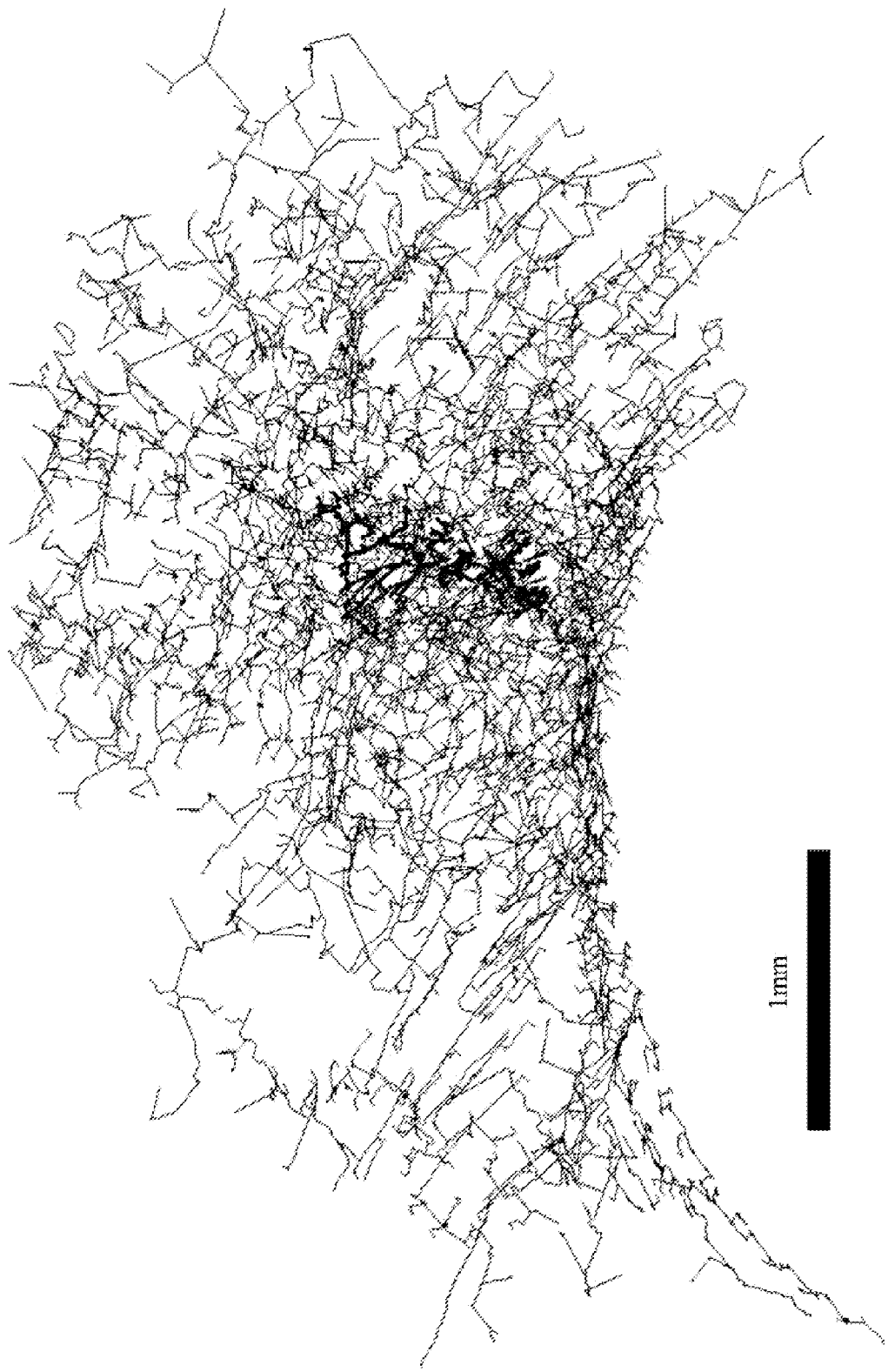
FIG. 13 shows an example CA3p/v pyramidal neuron reconstructed using an aspect of an embodiment of the present invention.

Results: Four different neurons have been reconstructed with this technique. In particular one CA3a (shown in FIG. 10), one CA3b (FIG. 11), one CA3c (shown in FIG. 12), and one CA3p/v (shown in FIG. 13). In these figures, the neurons are distinguished by their thickness. The CA3c neuron was previously reconstructed with the Neurolucida technique. This offers the unique opportunity to compare two different reconstructions of the same neuron. The total axonal length of the CA3c neuron reconstructed with this technique is 2.5% less than the corresponding Neurolucida based reconstruction. From an effort point of view a loss of 2.5% of data resulted in more than 80% drop in man-power required (from 6 man-months to 1 man-month).

The digital reconstruction embodiments may reduce the time to reconstruct lengthy axonal and dendritic arborization. Additionally no specialized hardware may be required other than camera lucida equipment 120 (which is common to a neuroanatomist) and a digitizer 140 such as an automated scanner. Manual intervention may be reduced to the tracing on paper of an arborization. Once the tracings are completed, the process may be automated using a single program or device or via a series of batch programs or devices. The end result should be a 3D digital reconstruction of an arborization that includes both axonal and dendritic trees.

FIGS. 14A and 14B show a comparison of a neuron traced using two different techniques. FIG. 14A shows three different 2D views of the same neuron traced using techniques described in this disclosure. FIG. 14B shows three different 2D views of the same neuron traced with Neurolucida, a commercially available system for performing neuroanatomical analysis available from MBF Bioscience of Williston, Vt. The black bars represent 1 mm.

FIGS. 15 through 19 show aspects of apparatus embodiments of the present invention for reconstructing arborization(s). The apparatus shown in FIG. 15 comprises: a slice image generator 1520, a vectorizer 1530, a segment typer 1540, and an arborization grouper 1550. The slice image generator 1520 may be configured to construct at least two slice images 1525 by carpeting a multitude of digital images 1510 based upon a 2-D reference system. Each of the multitude of digital images 1510 may be associated with a location in the 2-D reference system. Additionally, each of the slice images may have a different z-coordinate. At least one of the multitude of digital images 1510 should show a representation of at least a part of an arborization. The images 1510 may be digitized from drawings. In the case that the digital image(s) 1510 are of a brain slice(s), at least some of the drawings may have been made using the brain slice(s).

The vectorizer 1530 may be configured to vectorize at least one representation of an arborization on at least one slice image 1525. Preferably, the vectorization creates a series of segments 1535. The segment typer 1540 may be configured to generate typed segments 1545 by assigning a type to at least two of the series of segments based on a unique characteristic. Unique characteristics may include such things as the style of a line, the color of a line or an identifying symbol.

The arborization grouper 1550 may be configured to generate segment cluster(s) 1555 cluster by relating segments from the typed segments 1545 that represent at least one arborization. The arborization grouper groups the typed segments. In performing this operation, the arborization grouper may consider factors such as the z-slope of a segment, the z-position of a segment point within a slice. There are many ways in which the arborization grouper may join segments. For example, the arborization grouper may join segments from adjacent slices when points on each segment are within a close proximity of each other. Similarly, the grouping may join segments from within a slice when points on each segment are within a close proximity of each other. Additionally, the arborization grouper may join segments when points on each segment are within a close proximity of each other.

The arborization may include a neuronal arborization. The neuronal arborization may include dendrite(s) and/or axon(s). The arborization may include other types of arborization besides just a neuronal arborization. For example, it could include a cellular arborization, a capillary arborization etc.

Figure 15:
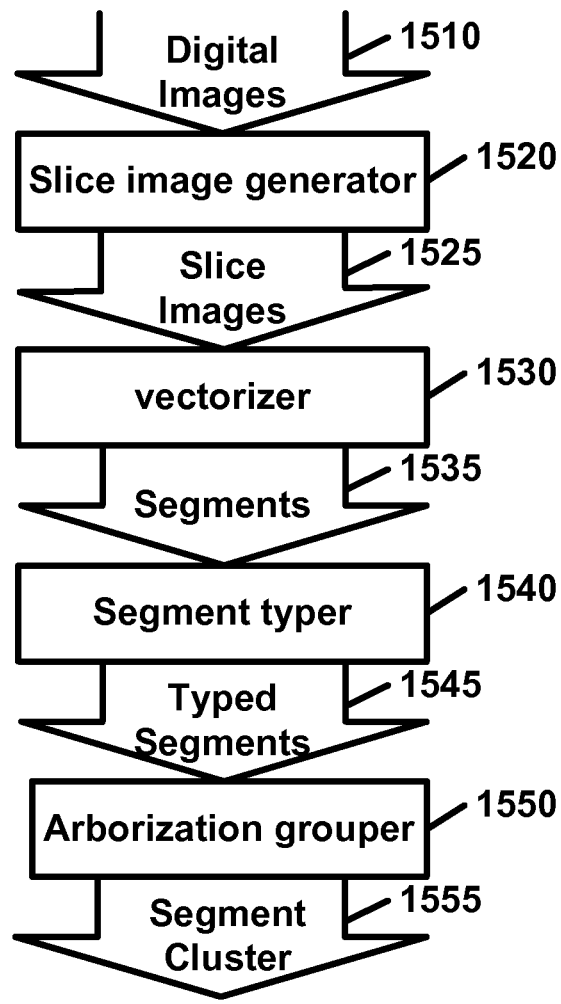
FIG. 15 shows a block diagram of an aspect of an embodiment of an apparatus for arborization reconstruction.
Figure 16:
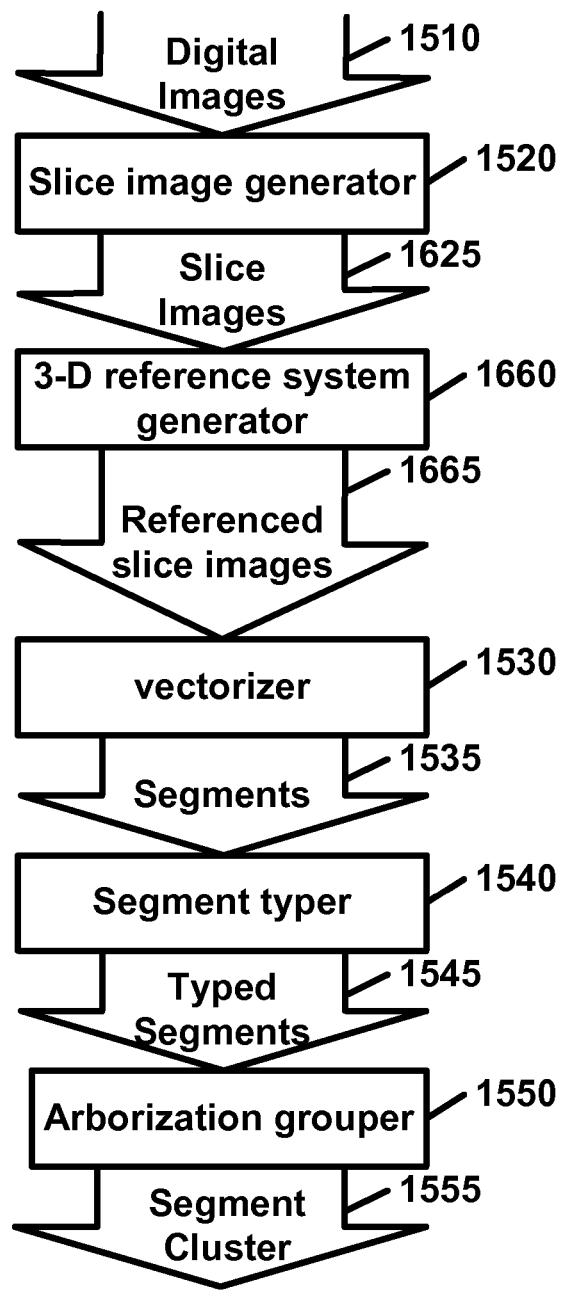
FIG. 16 shows a block diagram of another aspect of an embodiment of an apparatus for arborization reconstruction.

FIG. 16 shows a system similar to that in FIG. 15 with the addition of a 3-D reference system generator 1660 configured to create a 3-D reference system by aligning the 2-D reference systems between at least two of slice images 1625. The 3-D reference system generator may be capable of spatially processing digital images to create references slice images 1665. The spatial processing may include rotation and translation.

Figure 17:
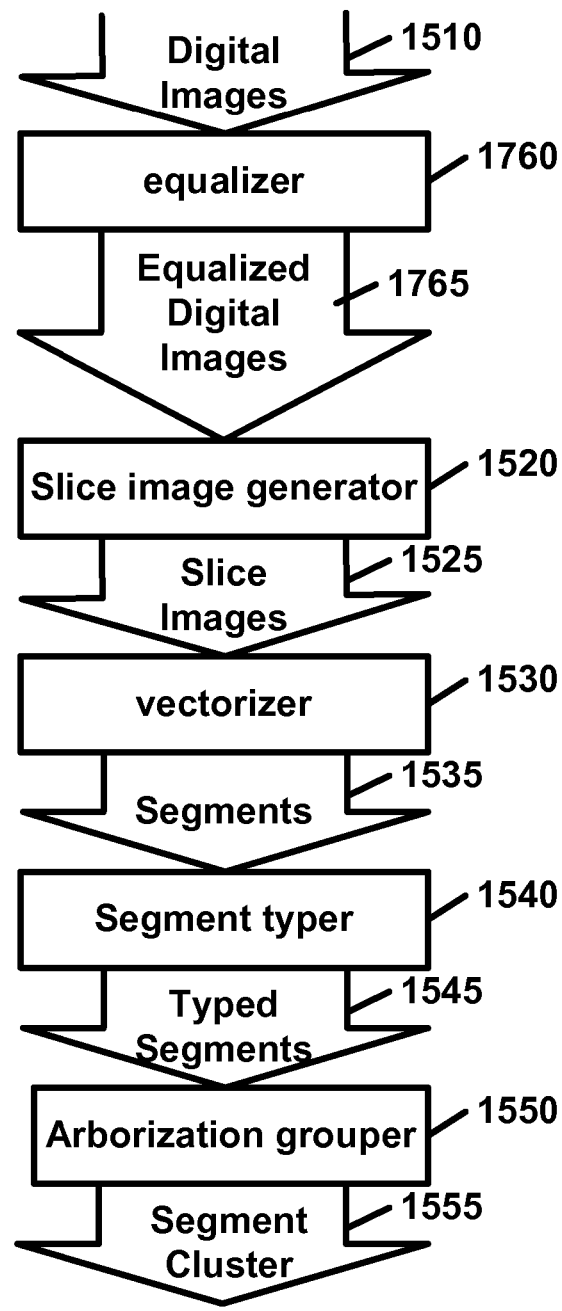
FIG. 17 shows a block diagram of another aspect of an embodiment of an apparatus for arborization reconstruction.

FIG. 17 shows a system similar to that in FIG. 15 with the addition of an equalizer 1760 configured to create equalized digital images 1765 by equalizing at least one of the digital images 1510. Examples of equalization techniques previously described may be used.

Figure 18:
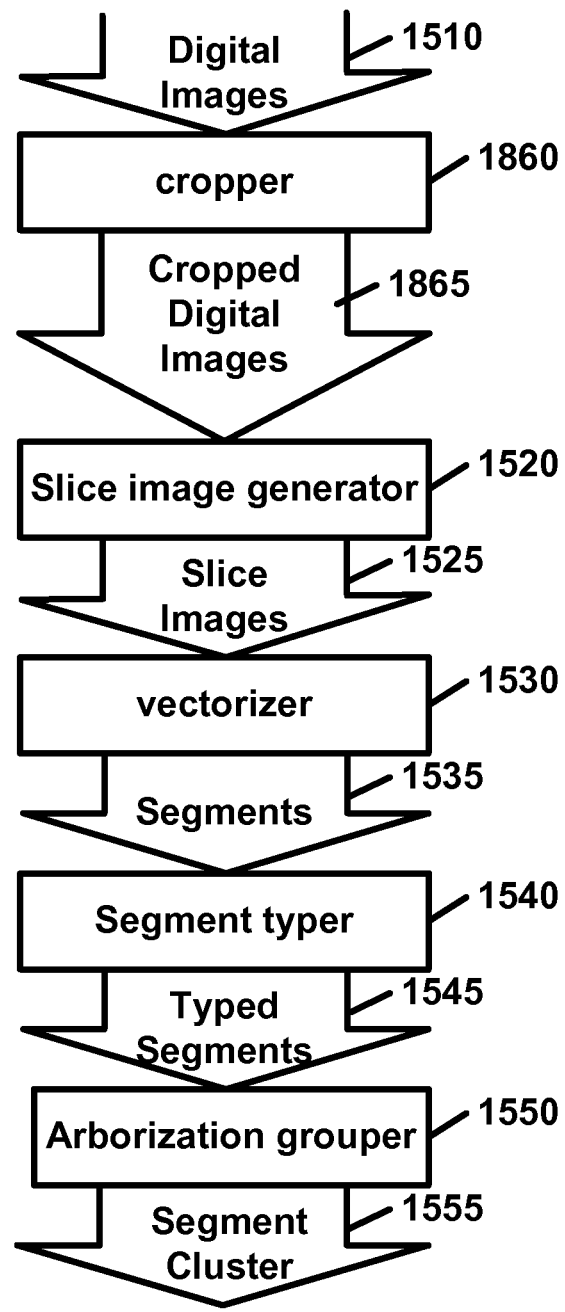
FIG. 18 shows a block diagram of another aspect of an embodiment of an apparatus for arborization reconstruction.

FIG. 18 shows a system similar to that in FIG. 15 with the addition of a cropper 1860 configured to generate cropped digital image(s) 1865 by cropping at least one of the digital images 1510 to within a predetermined area of interest. The predetermined area of interest may be defined by a bounding box as illustrated in FIG. 6A and FIG. 6B.

Figure 19:
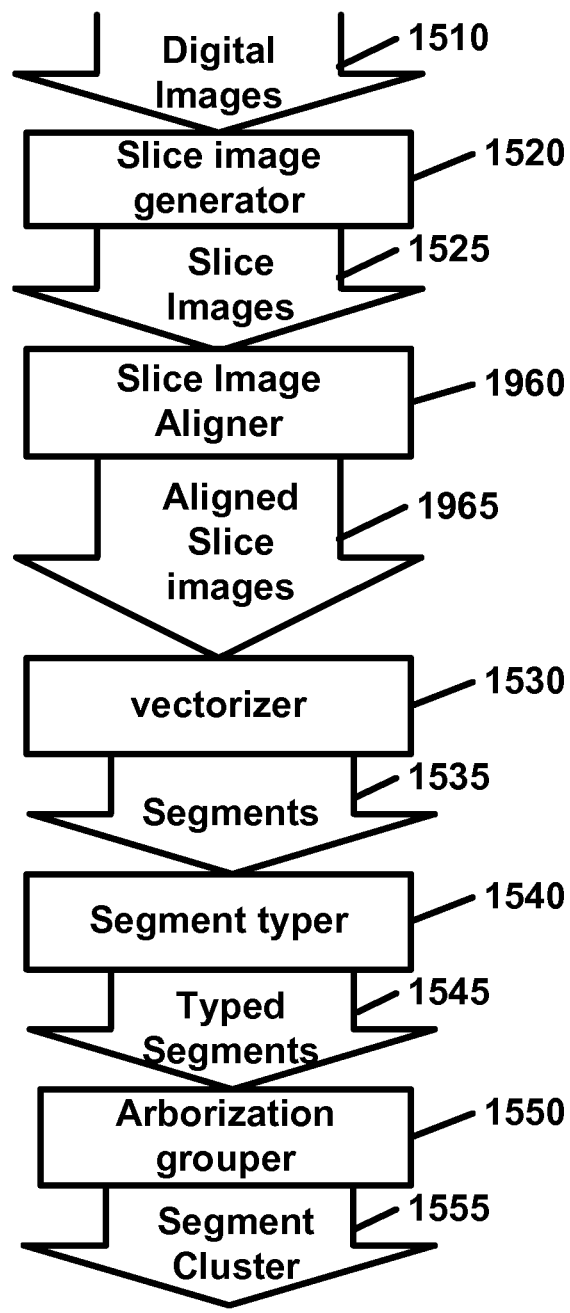
FIG. 19 shows a block diagram of another aspect of an embodiment of an apparatus for arborization reconstruction.

FIG. 19 shows a system similar to that in FIG. 15 with the addition of an image slice aligner 1960. The image slice aligner 1960 is configured to generate aligned slice images 1965 by aligning digital slice images 1525 using landmark information shown on at least one of the digital slice images 1525. After the alignment, the landmark information may be removed.

Figure 20:
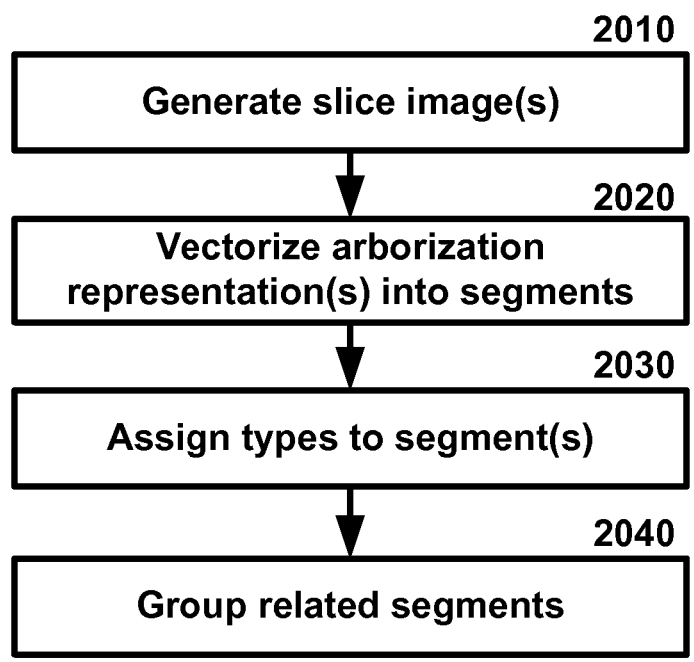
FIG. 20 shows a flow diagram of an aspect of an embodiment of a method for arborization reconstruction.

FIG. 20 is a flow diagram showing a method for arborization reconstruction as per an aspect of an embodiment of the invention. The method includes generating at least one slice image at 2010. One way to do this is to carpet digital images based upon a 2-D reference system. The digital images may be associated with a location in the 2-D reference system and have different z-coordinates. At least one of the digital images should include a representation of at least a part of an arborization. (It is possible that some neurons which are extremely flat, such as a Purkinje neuron, could lie entirely on a single slice). The digital images may be digitized from drawings and the drawings may be made from brain slices.

At 2020, at least one representation of an arborization on at least one slice image may be vectorized. The vectorization preferably creates a series of segments. A type can be assigned to at least one of the series of segments based on a unique characteristic at 2030. Related segments that represent at least one arborization may be grouped at 2040. This grouping may be represented in an electronic format such as the SWC format described earlier. The grouping may consider numerous factors such as the z-slope of a segment, the z-position of a segment point within a slice, and the x,y,z-position of a segment point within a slice. The grouping may also join segments in numerous ways such as joining segments from adjacent slices when points on each segment are within a close proximity of each other, joining segments from within a slice when points on each segment are within a close proximity of each other, and joining segments when points on each segment are within a close proximity of each other.

Figure 21:
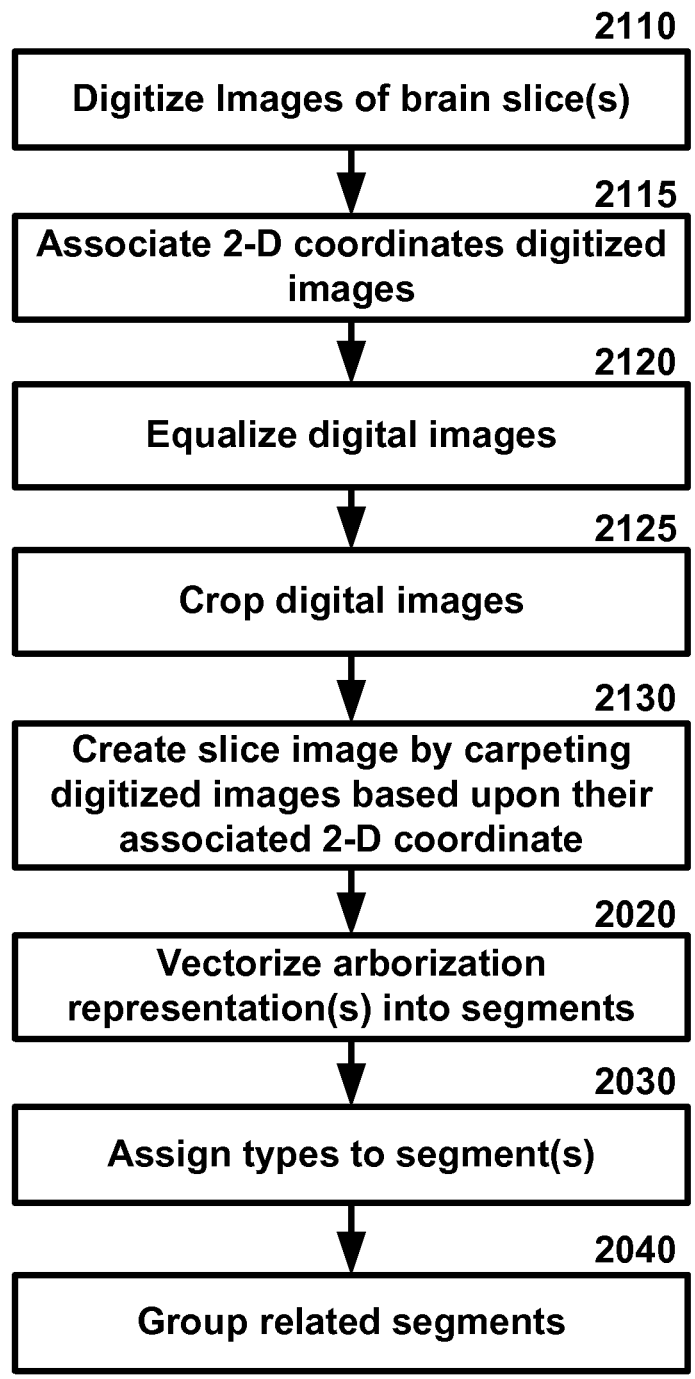
FIG. 21 shows a flow diagram of another aspect of an embodiment of a method for arborization reconstruction.

FIG. 21 shows additional steps that may be performed, in combination or individually, in addition to the steps shown in FIG. 20. For example, at 2110, images of brain slices may be digitized. A 3-D reference system may be created by aligning the 2-D reference system between at least two slice images at 2115. In the case of an extremely flat neuron, this step may be unnecessary. Landmark information located on some of the images may be used to align the images. After the alignment, the landmark information may be removed. The alignment may include performing operations such as rotation, and translation.

The digital images may also be processed in numerous ways before the vectorization at 2120. For example, the images may be equalized at 2120, or cropped to within a predetermined area of interest at 2125. At 2130, a slice image may be created by carpeting digitized images based upon their associated 2-D coordinate.

The following references may be used in understanding the presently claimed invention and are presented for that purpose.

Glaser, J. R., and Glaser, E. M., 1990, Neuron imaging with Neurolucida.a PC-based system for image combining microscopy, Comput. Med. Imaging Graph. 14(5):307.317.

Gras, H., and Killmann, F., 1983, NEUREC—a program package for 3D-reconstruction from serial sections using a microcomputer, Comput. Programs Biomed. 17(1.2):145.155.

Li, X. G., Somogyi, P., Ylinene, A,; and Buzsaki, G., 1994, The hippocampal CA3 network: an in vivo intracellular labeling study. J. Comp. Neur. 339:181-208.

Scorcioni, R., and Ascoli, G. A., 2005, Algorithmic reconstruction of complete axonal arborizations in rat hippocampal neurons, Neurocomputing 65-66:15-22.

Tamamaki, N., Abe, K., and Nojyo, Y., 1988, Three-dimensional analysis of the whole axonal arbors originating from single CA2 pyramidal neurons in the rat hippocampus with the aid of a computer graphic technique, Brain Res. 452(1.2): 255.272.

Wolf, E., Birinyi, A., and Pomahazi, S., 1995, A fast three-dimensional neuronal tree reconstruction The foregoing descriptions of the embodiments of the disclosure have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the disclosure and its practical application to thereby enable others skilled in the art to best utilize it in various embodiments and with various modifications as are suited to the particular use contemplated without departing from the spirit and scope of the disclosure. In fact, after reading the above description, it will be apparent to one skilled in the relevant art(s) how to implement the disclosure in alternative embodiments. Thus, the disclosure should not be limited by any of the above described example embodiments. For example, the above descriptions discuss digitizing the Lucida tracings using a scanner; however, one skilled in the art will recognize that other types of digitizers as digital cameras may be used such. Additionally, although the above descriptions describe arborization reconstruction with regard to neurons, it should be recognized that the invention should not be so limited. It is envisioned that the claimed invention may be used to reconstruct any type of arborization structure such as vascular tissue or ant colony.

In addition, it should be understood that any figures, graphs, tables, examples, etc., which highlight the functionality and advantages of the disclosure, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the disclosure in any way.

Furthermore, it is the applicants' intent that only claims that include the express language "means for" or "step for" be interpreted under 35 U.S.C. §112, paragraph 6. Claims that do not expressly include the phrase "means for" or "step for" are not to be interpreted under 35 U.S.C. §112, paragraph 6.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for arborization reconstruction comprising:
    performing processing associated with generating, using a processing device, at least one slice image by carpeting a multitude of digital images based upon a two-dimensional (2-D) reference system, each of the multitude of digital images associated with a location in the 2-D reference system and each showing a representation of an arborization and/or landmark such that digital images not showing a representation of an arborization and/or landmark are excluded;
    performing processing associated with carpeting the multitude of digital images together to create a slice image;
    performing processing associated with aligning the slice image with other similarly created slice images using landmark information to determine the amount of 2-D rotation and/or translation to be applied to each slice image;
    performing processing associated with vectorizing the representation of the arborization on each slice image, the vectorization creating a series of segments;
    performing processing associated with assigning a type to at least one of the series of segments based on a unique characteristic of arborization; and
    performing processing associated with grouping related segments together.

2. A method according to claim 1, further including creating a three-dimensional (3-D) reference system by aligning the 2-D reference system between at least two slice images.

3. A method according to claim 1, wherein the multitude of digital images are of a brain slice.

4. A method according to claim 1, wherein the multitude of digital images were digitized from drawings.

5. A method according to claim 1, further including equalizing at least one of the multitude of digital images.

6. A method according to claim 1, further including cropping at least one of the multitude of digital images to within a predetermined area of interest.

7. A method according to claim 1, wherein the grouping considers at least one of the following:
    a z-slope of a segment;
    a z-position of a segment point within a slice; and
    a x,y,z-position of a segment point within a slice.

8. A method according to claim 1, wherein the grouping joins at least one of the following:
    segments from adjacent slices when points on each segment are within a close proximity of each other;
    segments from within a slice when points on each segment are within a close proximity of each other; and
    segments when points on each segment are within a close proximity of each other.

9. A method according to claim 1, wherein the arborization includes a neuronal arborization.

10. An apparatus for arborization reconstruction comprising:
    a processing device in communication with an application, the application configured for:
    performing processing associated with generating at least one slice image by carpeting a multitude of digital images based upon a two-dimensional (2-D) reference system, each of the multitude of digital images associated with a location in the 2-D reference system and each showing a representation of an arborization and/or landmark such that digital images not showing a representation of an arborization and/or landmark are excluded;
    performing processing associated with carpeting the multitude of digital images together to create a slice image;
    performing processing associated with aligning the slice image with other similarly created slice images using landmark information to determine the amount of 24) rotation and/or translation to be applied to each slice image;
    performing processing associated with vectorizing the representation of the arborization on each slice image, the vectorization creating a series of segments;
    performing processing associated with assigning a type to at least one of the series of segments based on a unique characteristic of arborization; and
    performing processing associated with grouping related segments together.

11. An apparatus according to claim 10, further including a three-dimensional (3-D) reference system generator configured to create a 3-D reference system by aligning the 2-D reference system between at least two of the at least two slice images, the aligning including at least one of the following:

rotating at least one of the multitude of digital images: and
translating at least one of the multitude of digital images.

12. An apparatus according to claim 10, wherein the multitude of digital images are of a brain slice.

13. An apparatus according to claim 10, wherein the multitude of digital images were digitized from drawings.

14. An apparatus according to claim 10, further including an equalizer configured to equalize at least one of the multitude of digital images.

15. An apparatus according to claim 10, further including a cropper configured to crop at least one of the multitude of digital images to within a predetermined area of interest.

16. An apparatus according to claim 10, wherein the arborization grouper considers at least one of the following:
   a z-slope of a segment; and
   a z-position of a segment point within a slice.

17. An apparatus according to claim 10, wherein the arborization grouper joins at least one of the following:
   segments from adjacent slices when points on each segment are within a close proximity of each other;
   segments from within a slice when points on each segment are within a close proximity of each other; and
   segments when points on each segment are within a close proximity of each other.

* * * * *